United States Patent Office 2,899,396
Patented Aug. 11, 1959

2,899,396

2 VINYL PYRIDINE POLYMERS FOR ION EXCHANGE REACTIONS

Clark Edward Adams and Charles Newton Kimberlin, Jr., Baton Rouge, La., assignors to Esso Research and Engineering Company, a corporation of Delaware No Drawing. Application December 23, 1954
Serial No. 477,402

6 Claims. (Cl. 260—2.1)

This invention relates to the use of popcorn type polymers modified chemically to prepare ion- or electron-exchange resins.

The mechanism of formation and structure of the popcorn type polymers are not well understood at present, although studies have been made of these polymers to determine how to inhibit their formation in commercial processes where their formation is detrimental. They are formed in a manner different from that of conventional thermal or catalytic polymerization and they tend to have abnormally high molecular weights. They have the characteristic of being self-propagating, i.e. a portion of this type of polymer acts as a seed to form additional popcorn polymer from the monomer of a vinyl compound, e.g. butadiene, styrene and the like. Characteristics of the popcorn type polymers are described in U.S. Patent 2,446,969 of L. M. Welch, et al., which points out that these polymers are difficult or impossible to dissolve in ordinary solvents and are highly stable.

The literature points out that hitherto there have been no known industrial uses for materials of this type. Discussions of the popcorn polymers can be found in Jour. Ind. Eng. Chem., volume 39, page 830 (1947), by Kharash et al., and in the book entitled "Styrene," published by Reinhold Publishing Company, 1952, pp. 729–732 of Boundy and Boyer.

Although the popcorn type polymers, otherwise known as insoluble self-propagating type vinyl polymers, are normally insoluble in common organic solvents, are structurally resistant to strong reagents, such as acids and alkalies, and are relatively insensitive to temperature changes, it has been found that they can be modified chemically by addition of highly polar groupings to obtain different useful products. The polar grouping introduced may impart acidic characteristics; for example, a sulfonate group, or may impart alkaline characteristics as for example, an amino group. Some of the interesting modifications in which polymer groups are present are obtained from the popcorn polymer of nitrogen containing monomers.

An effective method of initiating polymerization to form the popcorn polymer without seeding is to place the monomer with a little water and a small amount of iron oxide in a warm environment. The polymerization takes place readily at 100°–300° F. Antioxidant type inhibitors, such as phenols, amino phenols and amides may be added to the monomer to reduce or eliminate conventional polymerization. A small amount of conjugated diene monomer, e.g. isoprene or 1,3-butadiene aids in initiating popcorn polymerization of vinyl monomers.

The following examples illustrate the preparation and utility of chemically modified popcorn polymers.

*Example 1.—Strongly acidic cation-exchange resin from popcorn polymers*

To prepare popcorn polystyrene 150 cc. of styrene monomer containing tertiary butyl catechol inhibitor, 50 cc. of water, a rusty 10-penny nail were placed in a stoppered one-quart glass bottle and stored at about 120° F. for a week. At the end of the week the polymerization was essentially complete; the popcorn polymer formed a tough, white, milky mass which nearly filled the entire bottle. The popcorn polymer was washed first with petroleum ether then with isopropyl alcohol and dried. The resulting polymer had a density of about 0.25 gram per cubic centimeter. The polymer was very porous and spongy in structure. It was insoluble in all solvents tried, such as aromatic hydrocarbons, chloroform and the like.

A high capacity exchange resin was prepared by treating 25 grams of the popcorn polystyrene with 250 cc. of concentrated sulfuric acid at 225±5° F. for 45 minutes. The sulfonated polymer was washed with water till the washings were free of acid and dried at about 225° F. The dried sulfonated polymer did not appreciably affect the pH of distilled water; however, when suspended in a sodium chloride solution it extracted the sodium ions leaving a strongly acid solution of hydrochloric acid. The capacity of the sulfonated polymer for removing sodium ions from sodium chloride was found to be about 2.375 equivalents of sodium ions per kilo of sulfonated polymer. This capacity compares favorably with commercially available cation exchange resins containing similar strongly acidic groups. In addition, the popcorn polymer is much more porous than the conventional type polymer and faster in its exchange reaction. Furthermore, the sulfonated popcorn polymer is less affected by solvents and elevated temperatures and, therefore, more suitable for use in nonaqueous media and at elevated temperatures than the sulfonated conventional polymers.

Although the exact structure of the popcorn polymer is not known, it can be considered chemically composed of many styrene monomer units (integer $x$ in number) and thus the sulfonating reaction is represented by the following equation:

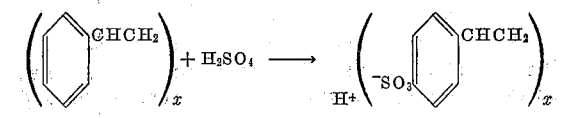

Popcorn polystyrene      Sulfonated popcorn polystyrene

*Example 2.—Soluble polymer of 2-vinylpyridine*

A conventional (that is, not popcorn) type polymer of 2-vinylpyridine was produced by exposing the monomer to diffuse sunlight for about a week and then to direct sunlight for an additional period of about a week. This polymer was found to be soluble in aqueous solutions of acids and was therefore of no value as an exchange resin.

*Example 3.—Water-insoluble exchange resin of popcorn 2-vinylpyridine*

150 cc. of 2-vinylpyridine monomer, 50 cc. of water and a rusty 10-penny nail were placed in a closed one-quart bottle and stored at 120° F. for about a week. Under these conditions no popcorn polymer was formed; therefore, the mixture was seeded by adding 5 grams of popcorn polystyrene as produced in Example 1. After about an additional week the 2-vinylpyridine was converted to a bulky mass of popcorn 2-vinylpyridine polymer. The polymer was washed with petroleum ether and isopropyl alcohol and dried at about 225° F. This polymer had an apparent density of about 0.25 and was spongy in structure. This polymer was insoluble in water and acid solutions and in the other solvents tried such as aromatic hydrocarbons, chloroform, and the like. It would absorb acids from solutions and the absorbed acids could be removed by treatment with an alkali such as sodium hydroxide solution; therefore, this popcorn polymer is useful as an anion exchange resin. Although the exact structure of the popcorn polymer is not known, it can be considered chemically composed of many 2-vinylpyridine monomer units and, therefore, may be represented by the following formula:

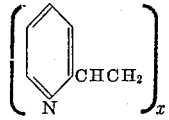

*Example 4.—Electron exchange resin*

40 grams of popcorn 2-vinylpyridine as prepared in Example 3 was treated with 50 grams of methyl bromide dissolved in 700 cc. of isopropyl alcohol in a closed container at room temperature for about six days. The resulting popcorn N-methyl-2-vinylpyridinium bromide was air dried and treated with fifteen times its weight of 10% alcoholic caustic solution at room temperature. The resulting polymer has a dark red color and is capable of entering into a reversible oxidation and reduction reaction; therefore, it may be used as an electron exchange resin. Although the exact nature of the transformations are not known, it is believed that treatment of the N-methyl-2-vinylpyridinium popcorn polymer causes a molecular rearrangement that may be represented as follows:

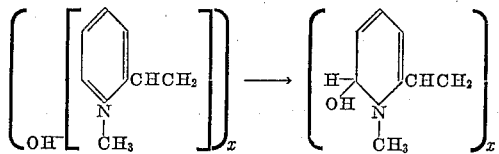

The reversible oxidation-reduction reaction may be represented as follows:

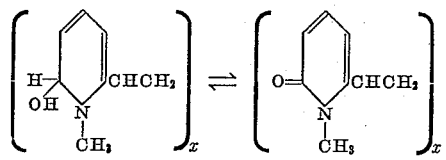

Other types of monomeric organic compounds noted to be able to form popcorn polymers are acrylonitrile and acrylates. The popcorn polymers of these materials may be also treated to form acidic or alkaline resins. By virtue of their ion and electron exchange properties, the described types of popcorn polymer exchange resins may be used for removing inorganic materials from organic compounds. For example, they may be used for removing sulfur in sweetening petroleum fractions, for removing peroxides or reducible polymer substances from lubricating oils and transformer oils. They find utility in removing metallic substances and thus may be used for removing iron, vanadium, and ash constituents from petroleum oils. They may also be used as solid catalytic agents or adsorptive materials; for example, in reduction of aldehydes to alcohols or selective oxidation of aldehydes to acids. Use may be made of these resins for catalyzing hydration reactions, e.g. hydration of olefins to form alcohols, ethers and the like or for esterification.

The invention described is claimed as follows:

1. A solid, porous, insoluble, proliferous homo-polymer of 2-vinyl pyridine.

2. A solid, porous, insoluble, proliferous homo-polymer of N-methyl-2-vinylpyridinium bromide.

3. An electron exchange resin consisting of a solid, porous insoluble, proliferous homo-polymer of N-methyl-2-vinylpyridinium bromide which has been treated with alkali.

4. A process for preparing a solid, porous, insoluble, proliferous homo-polymer of 2-vinyl pyridine which comprises maintaining the 2-vinyl pyridine monomer in the presence of minor amounts of water, iron oxide, and a seeding proliferous polymer at a temperature of 100° to 300° F. until a bulky mass of said homopolymer is formed.

5. A process according to claim 4 wherein the resulting homopolymer is treated with an alkyl halide to form an N-alkyl-2-vinylpyridinium halide polymer.

6. A process for preparing a high capacity electron exchange resin which comprises maintaining 2-vinylpyridine in the presence of minor amounts of water, iron oxide, and insoluble, proliferous polystyrene at a temperature of 100° to 300° F. until the conversion to the solid, porous, insoluble, proliferous 2-vinylpyridine polymer is about complete, treating the resulting proliferous polymer with methyl bromide to form N-methyl-2-vinyl pyridinium bromide polymer, and treating said halide polymer with an alcoholic caustic solution to form an insoluble polymer capable of entering into a reversible oxidation and reduction reaction.

References Cited in the file of this patent
UNITED STATES PATENTS

| 2,540,985 | Jackson | Feb. 6, 1951 |
| 2,597,438 | Bodamer | May 20, 1952 |
| 2,597,494 | Hwa | May 20, 1952 |

FOREIGN PATENTS

| 849,126 | France | Aug. 7, 1939 |

OTHER REFERENCES

Fitzgerald: Ind. Eng. Chem. 42, 1603–1606 (August 1950).

MacFarlane: J. Am. Chem. Soc., 77, 2195 (April 1955).